US011910893B2

(12) United States Patent
Victor

(10) Patent No.: US 11,910,893 B2
(45) Date of Patent: Feb. 27, 2024

(54) PORTABLE INSULATED FOOD CONTAINER

(71) Applicant: GLOBAL DESIGNS CO, Chennai (IN)

(72) Inventor: Kingston Victor, Chennai (IN)

(73) Assignee: Global Designs Co, Chennai (IN)

( * ) Notice: Subject to any disclaimer, the term of this patent is extended or adjusted under 35 U.S.C. 154(b) by 567 days.

(21) Appl. No.: 17/256,208

(22) PCT Filed: Jun. 15, 2019

(86) PCT No.: PCT/IN2019/050459
§ 371 (c)(1),
(2) Date: Dec. 27, 2020

(87) PCT Pub. No.: WO2020/003322
PCT Pub. Date: Jan. 2, 2020

(65) Prior Publication Data
US 2021/0120929 A1    Apr. 29, 2021

(30) Foreign Application Priority Data
Jun. 27, 2018 (IN) .............................. 201841023949

(51) Int. Cl.
*A45C 11/20* (2006.01)
*A47J 41/00* (2006.01)
*A47J 41/02* (2006.01)
*A47J 47/14* (2006.01)

(52) U.S. Cl.
CPC ........... *A45C 11/20* (2013.01); *A47J 41/0061* (2013.01); *A47J 41/028* (2013.01); *A47J 47/14* (2013.01)

(58) Field of Classification Search
CPC ....... A45C 11/20; A47J 41/00; A47J 41/0061; A47J 41/02; A47J 41/028; A47J 47/02; A47J 47/14
USPC ......................................................... 206/545
See application file for complete search history.

(56) References Cited

U.S. PATENT DOCUMENTS

| 4,225,052 A | 9/1980 | Tector et al. |
| 4,237,171 A | 12/1980 | Laage et al. |
| 5,125,391 A | 6/1992 | Srivastava et al. |
| 5,518,138 A * | 5/1996 | Boffito .................. A47J 41/022 220/592.27 |

(Continued)

FOREIGN PATENT DOCUMENTS

| EP | 2508044 A1 | 10/2012 |
| EP | 2560527 A2 | 2/2013 |

(Continued)

*Primary Examiner* — Bryon P Gehman
(74) *Attorney, Agent, or Firm* — Meunier Carlin & Curfman LLC

(57) ABSTRACT

The present invention relates to a portable insulated food container. More particularly the present invention relates to a portable insulated food container with a greater heat-retaining capacity. The portable insulated food container comprises of a vacuum insulated removable outer cover, a vacuum insulated base, a vacuum insulated base carrier, one or more non-insulated container(s), one or more detachable lid(s), a supporting base, and one or more interlocking units. Advantageously the present invention relates to a portable insulated food container with different shapes like oval, rectangle, square, hexagon, etc and sizes.

12 Claims, 13 Drawing Sheets

(56) References Cited

U.S. PATENT DOCUMENTS

| | | | |
|---|---|---|---|
| 6,199,699 B1* | 3/2001 | Eastman | A47J 47/14 |
| | | | 206/545 |
| 8,328,034 B2 | 12/2012 | Miros et al. | |
| 8,827,101 B2 | 9/2014 | Ye et al. | |
| 9,376,232 B2 | 6/2016 | Joy | |
| 9,555,948 B2* | 1/2017 | Nemeth | A47J 41/028 |
| 2009/0277914 A1 | 11/2009 | Guyn et al. | |
| 2013/0082044 A1 | 4/2013 | Doan | |
| 2013/0248537 A1* | 9/2013 | Lane | A47G 23/00 |
| | | | 220/574.3 |
| 2015/0158657 A1 | 6/2015 | Olson et al. | |
| 2016/0073751 A1 | 3/2016 | Charlebois et al. | |

FOREIGN PATENT DOCUMENTS

| | | | |
|---|---|---|---|
| IN | 102648662 A | 8/2012 | |
| IN | 201641019614 A | 12/2017 | |
| JP | H09215515 A | 8/1997 | |
| WO | 2011068988 A1 | 6/2011 | |
| WO | 2011131595 A2 | 10/2011 | |

* cited by examiner

PORTABLE INSULATED FOOD CONTAINER

PRIORITY

This application is a U.S. national application of the international application number PCT/IN2019/050459 filed on Jun. 15, 2019 and claiming priority of IN application number 201841023949 filed on Jun. 27, 2018, the contents of both of which are incorporated herein by reference.

FIELD OF THE INVENTION

The present invention relates to a portable insulated food container. More particularly the present invention relates to a portable insulated food container with a greater heat-retaining capacity.

BACKGROUND OF THE INVENTION

Many people pack their lunch or other meals for consumption away from home on a regular basis. Often, these meals may be dried up, at room temperature, and/or possibly contain deadly bacteria or other contamination. These pre-packed meals do not have means for proper storage and heating prior to their consumption. Packing lunch is not just for convenience for some. Many people have no choice but to bring their own lunch to work as their lunchtime locations can vary day in and day out, and often they may be working in areas where no other food source may be conveniently available. Also, lunchtime food options are often limited to people while on the job. Frequently these packed lunches are cheap sandwiches that, after remaining bagged up in a lunchbox or sitting on desk, only amount to stale bread and room temperature cold cuts by the time they are eaten.

The need to serve foods at their proper serving temperatures is not based on personal preference alone. If food is not stored or served at a proper temperature, the health of the person who eats this food may be jeopardized. Paper bags and lunch boxes do not adequately maintain proper storing temperatures of food items. As a result, people who resort to such common means of storing and carrying their lunches are at risk to pathogens such as, but not limited to, *E. Coli, Salmonella, Listeria* monocylognes, and *Campylobacter jejuni*, which are the four most common, not to mention most deadly, pathogens that standard lunch foods can easily contract when stored within standard containers. These bacterial pathogens can be defeated, however, if the food items are stored at a proper temperature and then served at a proper serving temperature. However, many people do not have access to refrigerators and ovens during their work shifts in order to do this.

Food covers for the purpose of keeping food warm until being served have heretofore been available. Such devices are typically used in an institutional setting, such as hospitals, school, office, etc where the old aged people, workers, students being delivered meals are located substantial distances from the central kitchen facility. Hence a substantial delay typically occurs between the time when the food is placed in the food container and the time when it is delivered to the patient or individual.

In situations where elderly people consume food which is not prepared right before consumption, would require suitable food storage containers to ensure that the food is stored at the right temperature. Consuming fresh food at the right temperature is highly essential for elderly people as they are at a vulnerable age, for any health issues.

IN201641019614 discloses a food container. The new invention is to have the opening of the food box at the bottom, thereby retaining the hot air inside the steel shell and resulting in a warmer temperature of the top most food container inside and overall warmer temperature of all the containers even after a prolonged time of storage compared to the other products that are available in the market. However only the top cover is insulated and base material is made up of plastic and so food cannot retain heat compared to our present invention.

US20090277914A1 discloses a portable food warmer. An insulated, portable, hot food container maintains the temperature of cooked foods. The container has an insulated housing having an insulated base, insulated enclosing walls, and an insulated removable cover. The insulated removable cover engages the insulated enclosing walls to resist movement parallel to the insulated base. The insulated removable cover having grips to enable lifting of the insulated removable cover from the insulated base. The insulated base having grips to enable the container to be lifted and support both the insulated base and the insulated cover. A support carrier is inserted into and removed from the container, the support carrier having a base support surface and raised edges circumscribing the base support surface to restrict horizontal flow of liquids. However no absorbent insulating material or any polymeric material is used in our invention and the portable food warmer is difficult and complex.

U.S. Pat. No. 4,225,052A discloses an insulated food container. A food container for the transport of a hot prepared meal having a dish or tray portion and a cover, both of which are insulated and engageable to form a seal which retains the flavor and warmth of the food within. The cover has a handle which may be laid flat to allow a like container to rest on it in a stable manner. The dish portion has a plurality of sections, one of which may contain a cup for beverages. However both cover and dish are of multi-layer construction with an inner layer of insulation material sandwiched between two outer layers of high-impact plastic and the invention is complex. No insulation material is used in our Invention.

US20160073751A1 discloses an Insulated Food Carrying System of Nesting Devices. A nestable and portable, temperature controlling food container device that is used to house, transport and keep a bowl of food hot or cold. The product has a removable lid, which can be opened or closed and is attached with a zipper to the body of the device. It has internal house a cooling or heating element with secured flap covering the element, which allows the user to place hot or cold packs inside them. These packs will keep food either cold or hot as per the needs of the user. The device has handles to allow easy transport of the unit. However their arrangement is a zipper contains different compartments in a water proof bag itself to keep temperature control elements.

JPH09215515A discloses a portable lunch case. In this portable lunch case equipped with an adiabatic container 1, an outer lid 5 provided in an upper opening of the adiabatic container, and food containers 2, 3, and 4 accommodated in the adiabatic container, the adiabatic container is made to be non-circular, cylindrical-shaped with bottom and also at least one of the food containers is made to be a heat accumulating container 3 having a heat accumulating part 3c formed by attaching a heat accumulating material 3f to a part of the container. However the lunch case will not retain heat.

The food carrier is essential for transporting food and storing food safely without spillover/leakage and to be consumed at a later time. The features essentially lies in maintaining the food in good condition and ensuring good locking means for safe transportation.

Accordingly, there exists a need for a portable insulated food container with a greater heat-retaining capacity.

OBJECTS OF INVENTION

It is the primary object of the present invention to provide a portable insulated food container with a greater heat-retaining capacity/high thermal efficiency.

It is another object of the present invention to provide a portable insulated food container with different shapes like oval, rectangle, square, hexagon, etc and different sizes.

It is another object of the present invention to provide a fully (top and bottom) vacuum insulated food container.

It is another object of the present invention, wherein the heat retention ability is improved with the upside down approach of the cover reaching the vacuum insulated base.

SUMMARY OF THE INVENTION

One or more of the problems of the conventional prior art may be overcome by various embodiments of the present invention.

It is the primary aspect of the present invention to provide a portable, insulated food container comprising:
  a vacuum insulated removable outer cover [3];
  a vacuum insulated base [4];
  a vacuum insulated base carrier [5];
  one or more non-insulated container(s) [6A];
  one or more detachable lid(s) [6];
  a supporting base [4A];
  one or more interlocking units [7,8];
    wherein the vacuum insulated base carrier [5] and the vacuum insulated base [4] is a unitary system,
    wherein the vacuum insulated removable outer cover [3] consists of one or more grips [1,2];
    wherein the interlocking unit comprises of one or more latches [7] on the side walls of the vacuum insulated base carrier [5] and one or more knobs/locking pins [8] on the side walls of the vacuum insulated removable outer cover [3],
    wherein an activated getter pill is used to maintain a high vacuum in the system,
    characterized in that the vacuum insulated carrier [5] is configured to receive the outer cover [3] which snug fits on the carrier [5] at the insulated base [4], and
    wherein the snug fit of the outer cover [3] and the vacuum insulated carrier [5] at the outer rim [10] of the base carrier [5] prevents conduction heat loss to a minimal.

It is another aspect of the present invention, wherein the latches [7] and the locking pins [8] are configured together with twist lock mechanism for removably closing/sealing the food container.

It is another aspect of the present invention, wherein the wall section of the inner portion of the vacuum insulated cover [3] from the inner edge of the rim [11] to the height proportionate to the height from the outer rim [10] of the base carrier [5] to the outer edge of inner rim [9] of the base carrier [5] is made thinner than the other portions of the wall.

It is another aspect of the present invention, wherein the wall section of the outer wall of base carrier [5], from the outer edge of inner rim [9] of base carrier [5] to the outer rim [10] of base carrier [5] is made thinner than the other portions of the wall of base carrier [5].

It is another aspect of the present invention, wherein the vacuum insulated base carrier [5] is stacked over by one or more detachable non insulated container(s) [6A] with detachable lid(s) [6] adapted to form a tight seal with the inner rim [9] of the base carrier [5].

It is another aspect of the present invention, wherein the grip comprises of one or more top handles [1] and one or more side handles [2] affixed to the vacuum insulated top cover [3].

It is another aspect of the present invention, wherein the detachable lid [6] is adapted to form a tight seal with the inner rim [9] of the vacuum insulated base carrier [5].

It is another aspect of the present invention, wherein the height of the outer insulated cover [3] is greater than the height of the insulated base carrier [5].

It is another aspect of the present invention, wherein the supporting base [4A] is affixed to bottom portion of the vacuum insulated base [4].

It is another aspect of the present invention, wherein the lid(s) [6] is made of BPA free plastic/stainless steel.

It is another aspect of the present invention, wherein a rim [11] of the vacuum insulated outer cover [3] is configured to be received by the rim [10] of the base carrier [5].

It is another aspect of the present invention, wherein the vacuum insulated cover [3] is inserted over the vacuum insulated carrier [5] up to the rim [10] of the vacuum insulated carrier [5] for heat insulation.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawing, which form a part of this specification. It is to be noted, however, that the drawing illustrate only a preferred embodiment of the invention and is therefore not to be considered limiting of the invention's scope as it may admit to other equally effective embodiments.

DESCRIPTION FOR DRAWINGS WITH REFERENCE NUMERALS

Figure 1A:
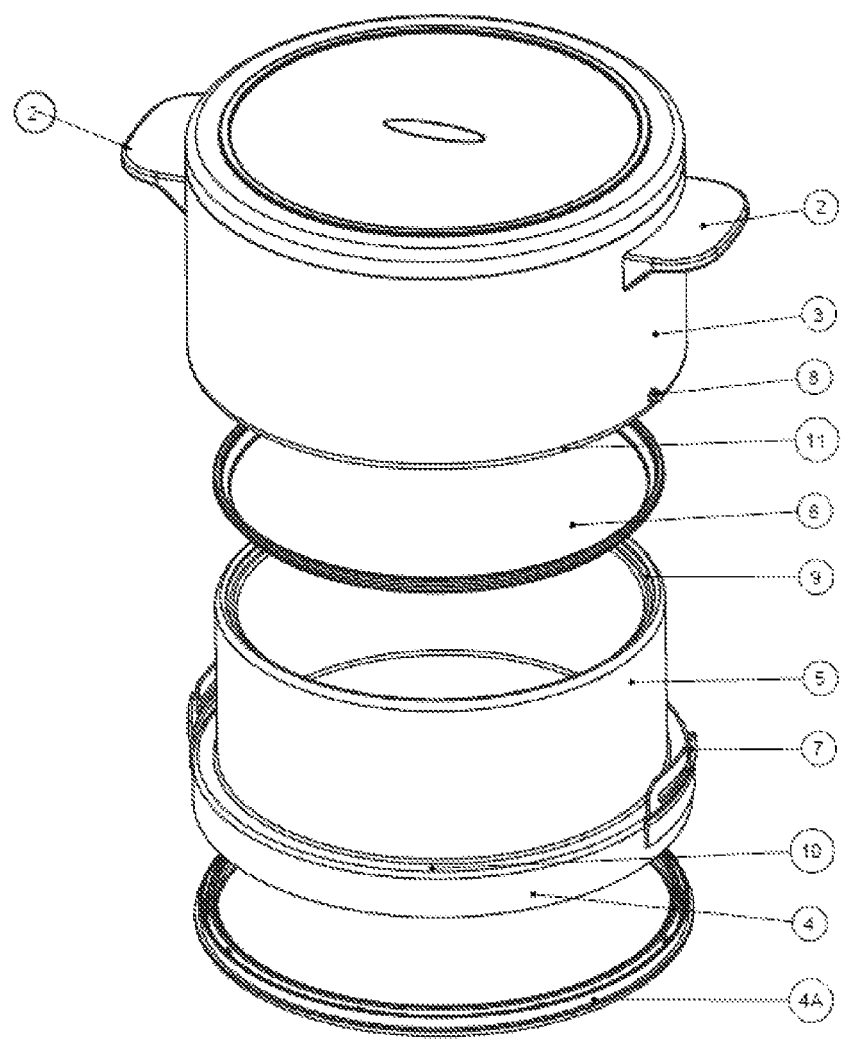
FIG. 1a: illustrates the exploded perspective view of the small insulated food container according to one embodiment of the present invention.

[1, 2] One or more grips such as top handle [1], side handle(s) [2]
[3] Vacuum insulated outer cover
[4] Vacuum insulated base
[4A] Supporting base
[5] Vacuum insulated base carrier
[6] Detachable lid(s)
[6A] Non-insulated container(s)
[7, 8] One or more interlocking units such as latches [7] and locking pins/knobs [8]
[9] Inner rim of the vacuum insulated base carrier
[10] Outer rim of the vacuum insulated base carrier
[11] Rim of vacuum insulated outer cover

DETAILED DESCRIPTION OF THE INVENTION WITH REFERENCE TO THE ACCOMPANYING FIGURES

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The following descriptions further illustrate one or more embodiments in detail and any section of the descriptions can be solely used and combined in any suitable manner in one or more embodiments.

The present invention as herein described relates to a portable insulated food container. The present invention can be manufactured with two and three containers and so on according to the customer requirements. Referring to FIG. 1a: illustrates the exploded perspective view of the small insulated food container according to one embodiment of the present invention. The portable, insulated food container comprises of a vacuum insulated removable outer cover [3], a vacuum insulated base [4], a vacuum insulated base carrier [5], one or more non-insulated container(s) [6A], one or more detachable lid(s) [6], a supporting base [4A], and one or more interlocking units [7,8].

The vacuum insulated base carrier [5] and the vacuum insulated base [4] is a unitary system. The vacuum insulated removable outer cover [3] consists of one or more grips [1, 2]. The interlocking unit comprises of one or more latches [7] on the outer wall of the vacuum insulated base carrier [5] and one or more knobs/locking pins [8] on the vacuum insulated removable outer cover [3]. An activated getter pill is used to maintain a high vacuum in the system which is not visible from outside. The vacuum insulated carrier [5] is configured to receive the outer cover [3] which snug fits on the carrier [5] at the base [4]. The snug fit of the outer cover [3] and the vacuum insulated carrier [5] at the outer rim [10] of the base carrier [5] is preventing conduction heat loss to a minimal.

The latches [7] and the locking pins [8] are configured together with twist lock mechanism for removably closing/sealing the food container. The wall section of the inner portion of the vacuum insulated cover [3] from the inner edge of the rim [11] to the height proportionate to the height from the outer rim [10] of the base carrier [5] to the outer edge of inner rim [9] of the base carrier [5] is made thinner than the other portions of the wall. The wall section of the outer portion of base carrier [5] from the outer edge of inner rim [9] of the base carrier [5] to the outer rim [10] of the base carrier [5] is made thinner than the other portions of the wall.

The vacuum insulated base carrier [5] is stacked over by one or more non insulated container(s) [6A] with detachable lid(s) [6] adapted to form a tight seal with the inner rim [9] of the base carrier [5].

The grip comprises of one or more top handles [1] and one or more side handles [2] affixed to the vacuum insulated top cover [3]. The detachable lid [6] is adapted to form a tight seal with the inner rim [9] of the vacuum insulated base carrier [5].

The height of the outer insulated cover [3] is greater than the height of the insulated base carrier [5]. The vacuum insulated base carrier [5] is configured to stack one or more non-vacuum insulated container(s) [6A] with the air tight removable lids [6] on the top for increased storage. The supporting base [4A] is affixed to bottom portion of the vacuum insulated base [4]. The lid(s) [6] is made of BPA free plastic/stainless steel. A rim [11] of the vacuum insulated outer cover [3] is configured to be received by the rim [10] of the base carrier [5]. The vacuum insulated cover [3] is inserted over the vacuum insulated carrier [5] up to the rim [10] of the vacuum insulated carrier [5] for heat insulation.

Figure 1B:
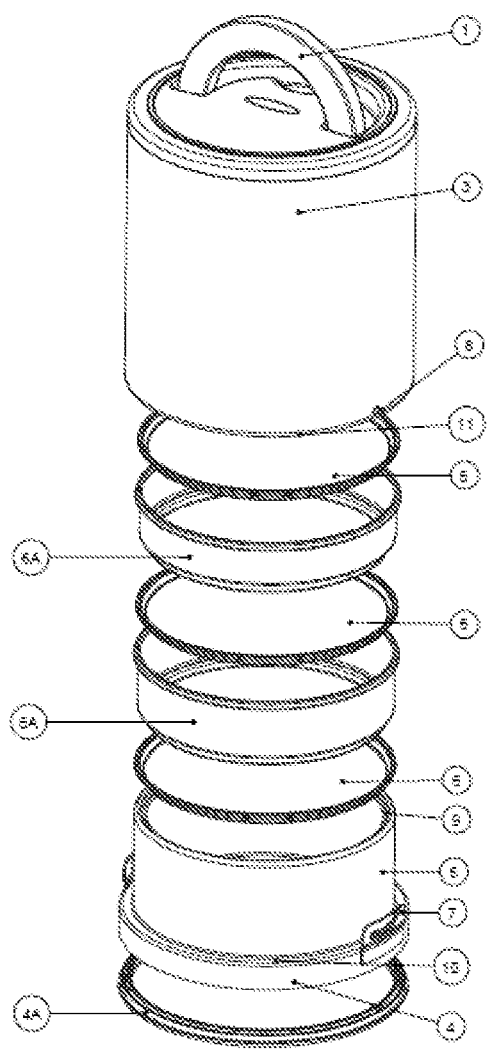
FIG. 1b: illustrates the exploded perspective view of the big insulated food container according to another embodiment of the present invention.

Referring to FIG. 1b, illustrates the exploded perspective view of the big insulated food container according to another embodiment of the present invention. The portable insulated food container is provided with a greater heat-retaining capacity/high thermal efficiency. The portable insulated food container is provided with different shapes like oval, rectangle, square, hexagon, etc and sizes. A fully (top and bottom) vacuum insulated food container is provided. The heat retention ability is improved with the upside down approach of the cover reaching the vacuum insulated base.

Figure 2A:
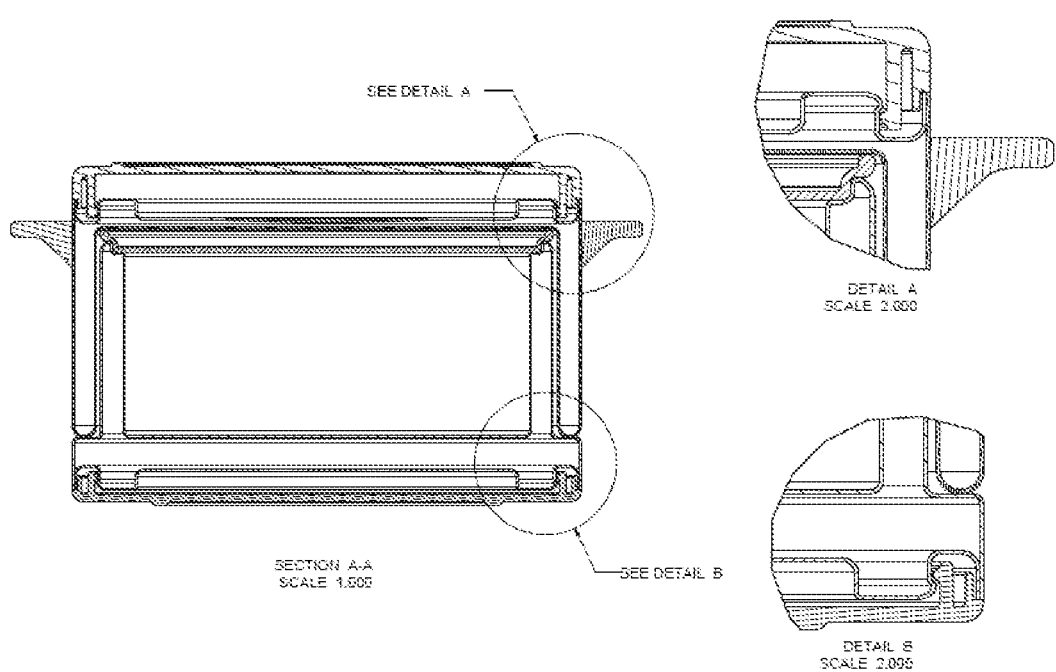
FIG. 2a: illustrates the front sectional view of the small insulated food container according to one embodiment of the present invention.

Referring to FIG. 2a, illustrates the front sectional view of the small insulated food container according to one embodiment of the present invention. The figure clearly explains the gap between all the parts and we can see that there is very less gap between the carrier and top cover. The scale is 1.000. The scale for detail B and detail C is 2.000.

Figure 2B:
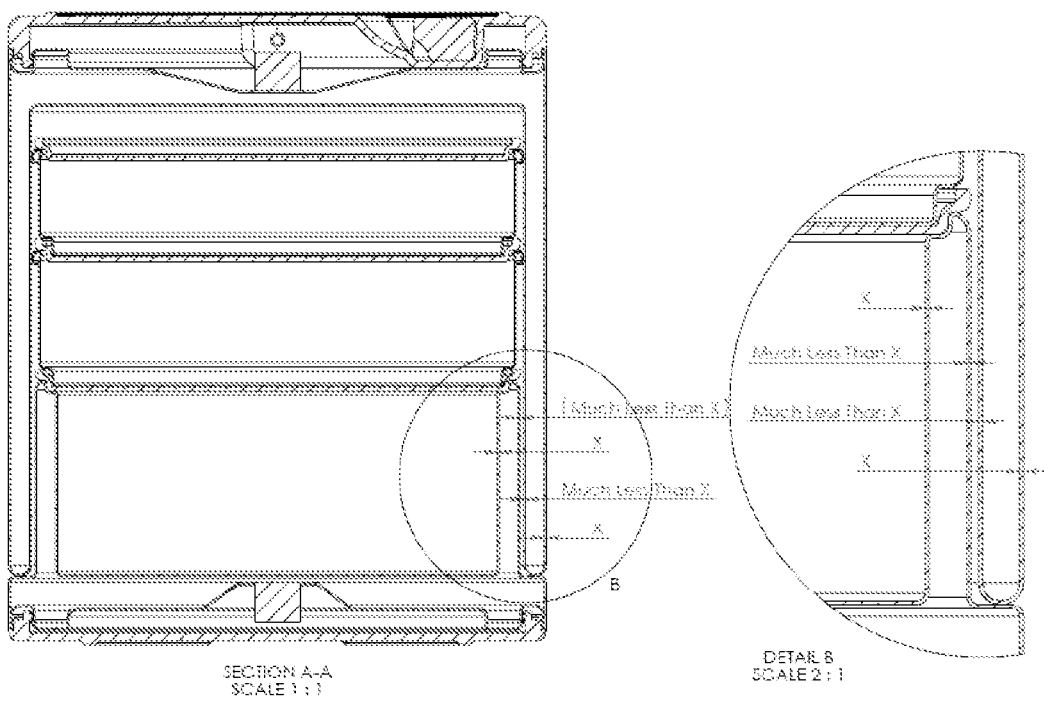
FIG. 2b: illustrates the front sectional view of the big insulated food container according to another embodiment of the present invention.

Referring to FIG. 2b, illustrates the front sectional view of the big insulated food container according to another embodiment of the present invention. The figure clearly explains the gap between all the parts and we can see that there is very less gap between the carrier and top cover. The scale for section A-A is preferably 1.1. The scale for detail B is preferably 2.1.

Figure 3A:
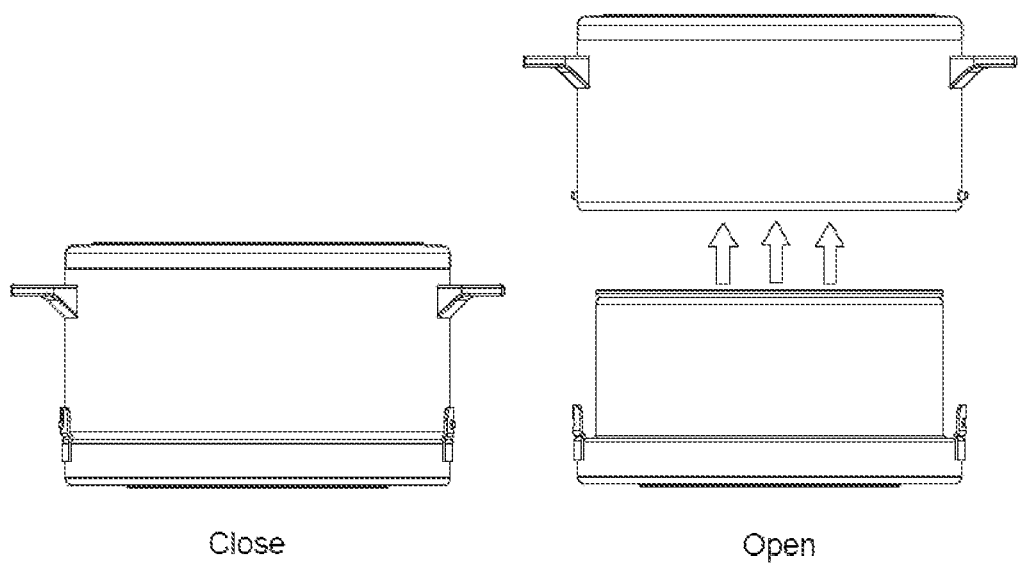
FIG. 3a: illustrates the front sectional view explaining the opening and closing of the small insulated food container according to one embodiment of the present invention.
Figure 3B:
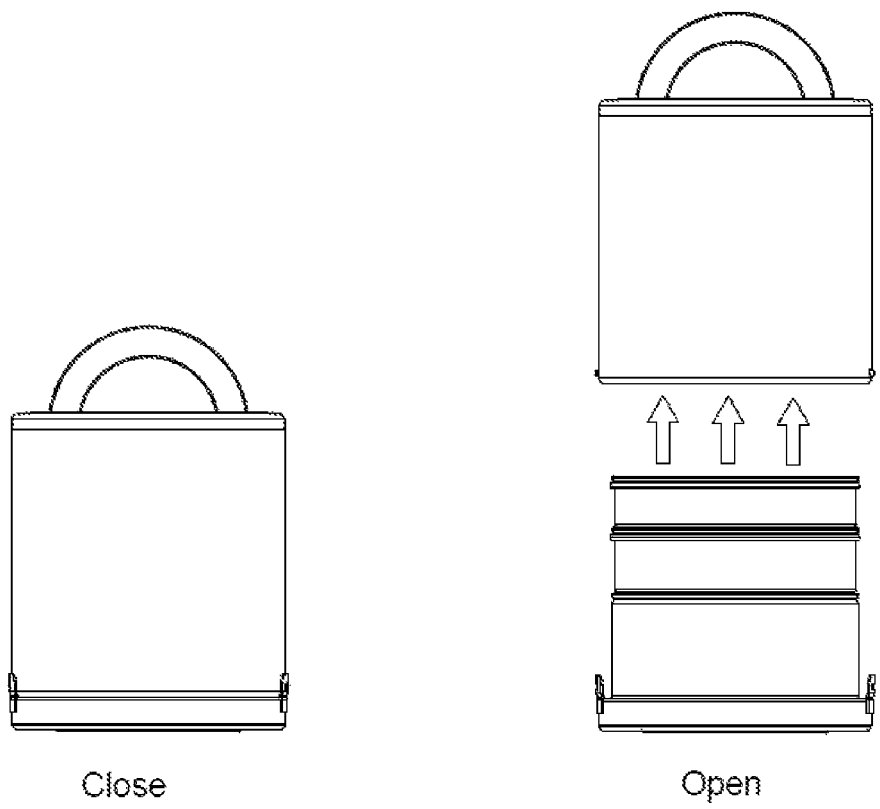
FIG. 3b: illustrates the front sectional view explaining the opening and closing of the big insulated food container according to another embodiment of the present invention.

Referring to FIGS. 3a, 3b, illustrates the front sectional view explaining the opening and closing of the small and big insulated food container according to one embodiment of the present invention. The figure explains how the food container is opened and closed. The container is opened using upside down approach.

Figure 4A:
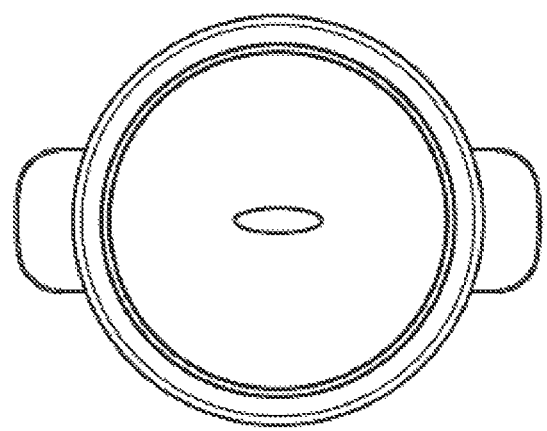
FIG. 4a: illustrates the top view of the small insulated food container according to one embodiment of the present invention.
Figure 4B:
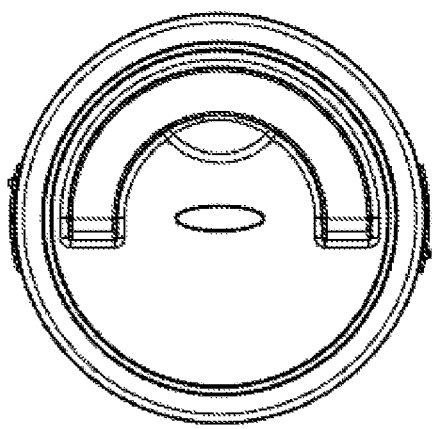
FIG. 4b: illustrates the top view of the big insulated food container according to another embodiment of the present invention.

Referring to FIGS. 4a, 4b illustrates the top view of the small and big insulated food container according to one embodiment of the present invention. The big insulated food container has one top handle and the small insulated food container has two side handles as of now.

Figure 5A:
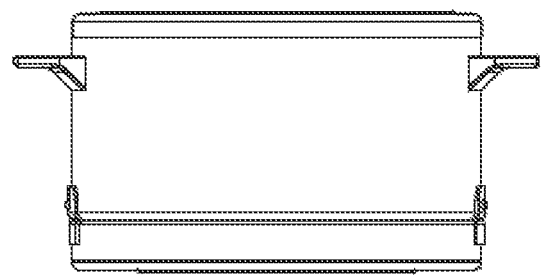
FIG. 5a: illustrates the front view of the small insulated food container according to one embodiment of the present invention.
Figure 5B:
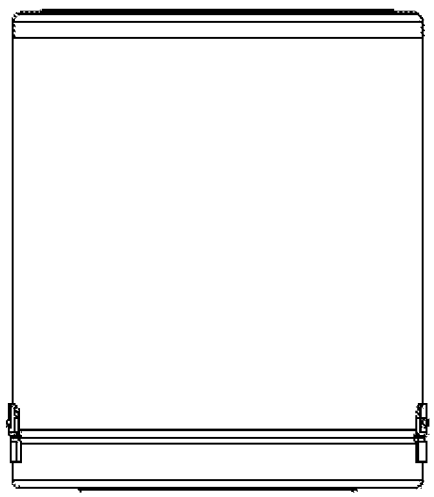
FIG. 5b: illustrates the front view of the big insulated food container according to another embodiment of the present invention.

Referring to FIGS. 5a, 5b, illustrates the front view of the small and big insulated food container according to one embodiment of the present invention. This figure clearly defines all the outer parts of the container.

Figure 6A:
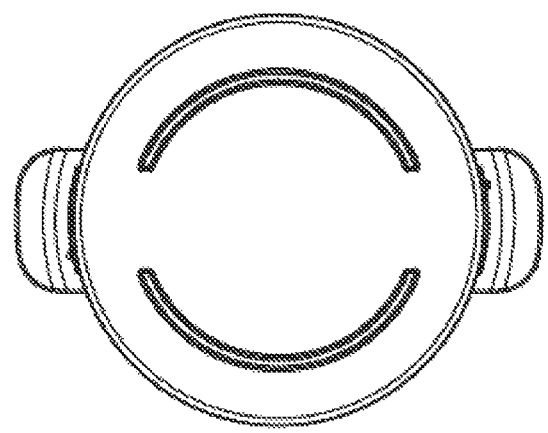
FIG. 6a: illustrates the bottom view of the small insulated food container according to one embodiment of the present invention.
Figure 6B:
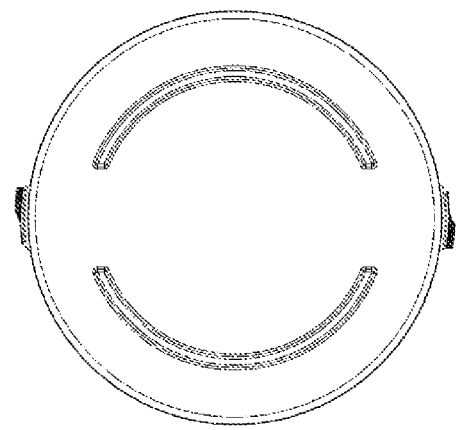
FIG. 6b: illustrates the bottom view of the big insulated food container according to another embodiment of the present invention.

Referring to FIGS. 6a, 6b, illustrates the bottom view of the small and big insulated food container according to one embodiment of the present invention. This figure clearing gives a view of the supporting base.

Figure 7A:
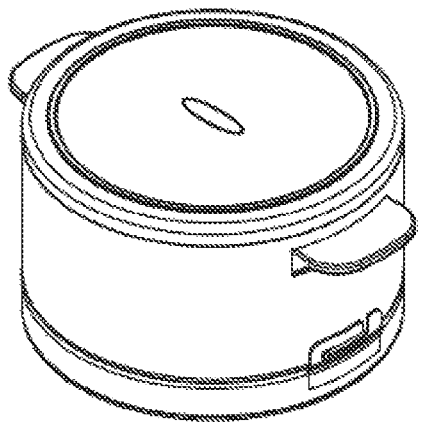
FIG. 7a: illustrates the isometric view of the small insulated food container according to one embodiment of the present invention.
Figure 7B:
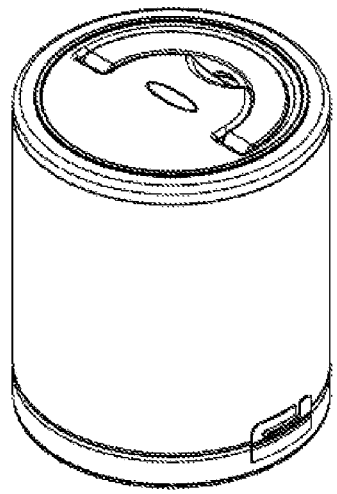
FIG. 7b: illustrates the isometric view of the big insulated food container according to another embodiment of the present invention.

Referring to FIGS. 7a, 7b, illustrates the isometric view of the small and big insulated food container according to one embodiment of the present invention. This figure clearly defines all the outer parts of the container including the twist mechanism by the latches and knob.

Figure 8:
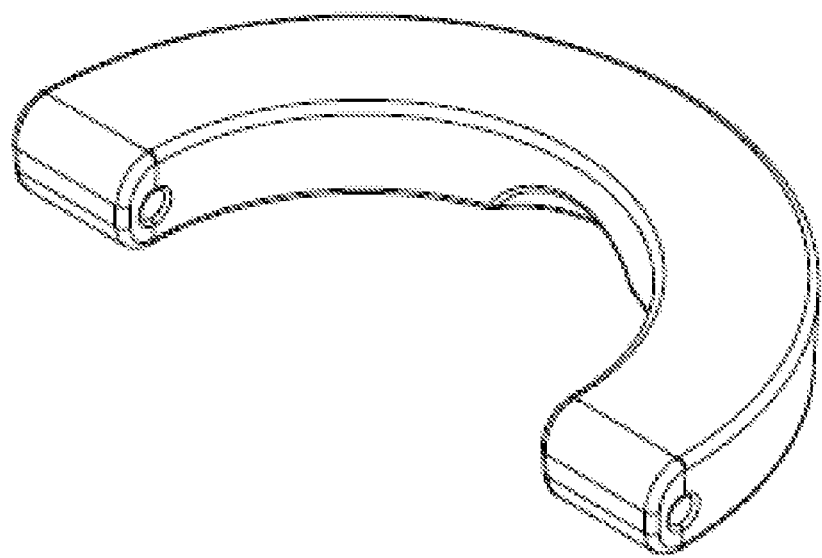
FIG. 8: illustrates the isometric view of the top handle of the big insulated food container according to one embodiment of the present invention.

Referring to FIG. 8, illustrates the isometric view of the top handle of the big insulated food container according to one embodiment of the present invention.

Figure 9:
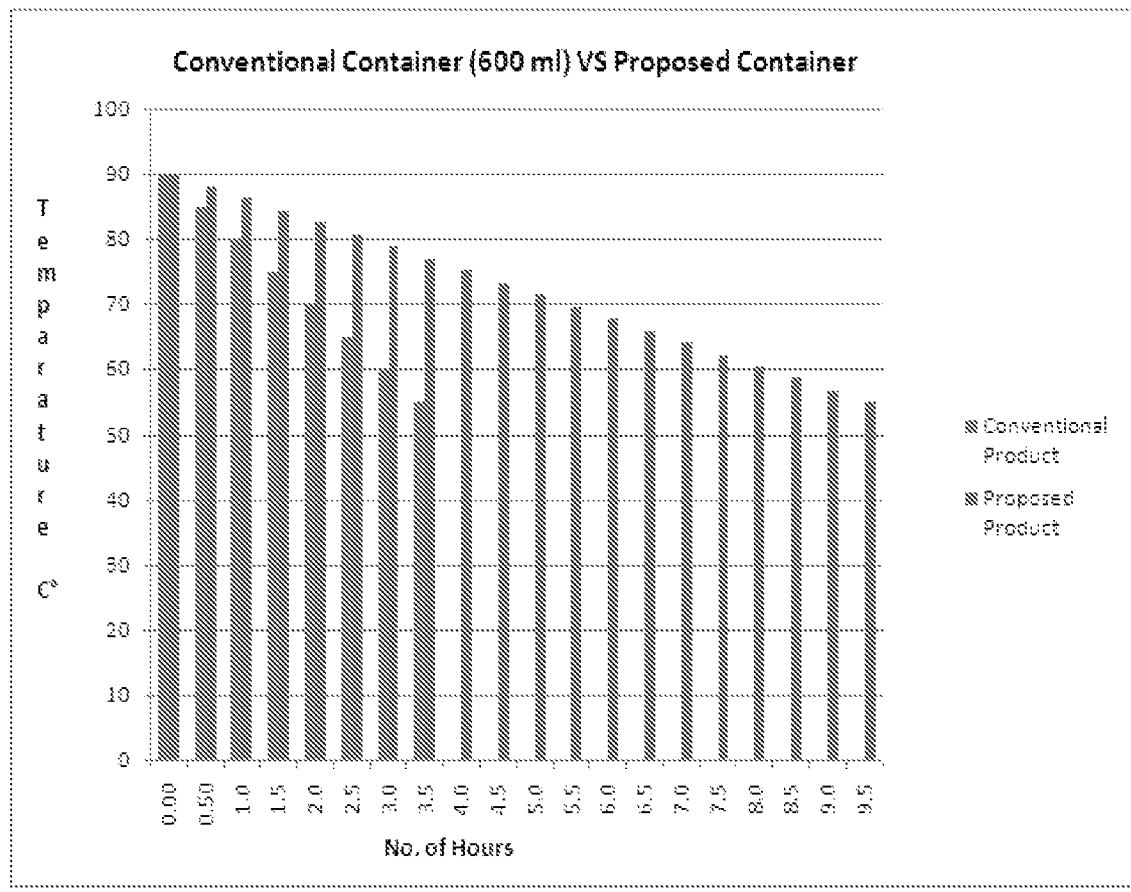
FIG. 9: illustrates the graphical illustration of the heat retention capacity of a conventional container Vs the proposed container of the small insulated food container according to one embodiment of the present invention.

Referring to FIG. 9, illustrates the graphical illustration of the heat retention capacity of a conventional container Vs the proposed container of the small insulated food container according to one embodiment of the present invention.

Example 1

We have tested the above mentioned products with the following criteria in our Lab.

Capacity: Convention container—600 ml; Proposed container—625 ml

Content used to fill the carrier: Sambar Rice (kept at 90° C.)

Quantity filled: 480 grams each product. (i.e., 80% of the Capacity)

Room Temperature: 28 degrees centigrade.

Note: The optimal temperature to consume the food is 55 degrees centigrade.

So the data was taken from 90 to 55 degree centigrade for both the products. Thus the comparison chart is presented. The convention product retention capacity is 3.50 Hours only whereas the proposed product retention capacity is 9.50 Hours.

Figure 10:
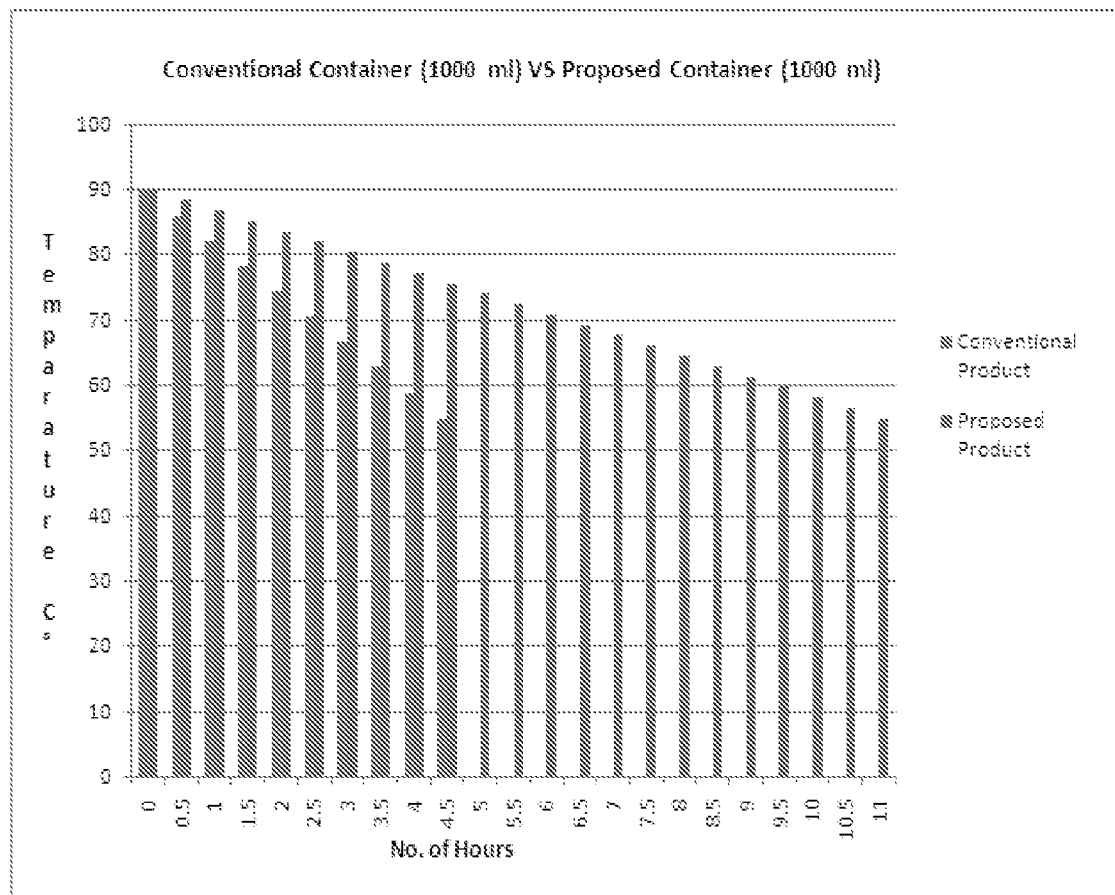
FIG. 10: illustrates the graphical illustration of the heat retention capacity of a conventional container Vs the proposed container of the big insulated food container according to one embodiment of the present invention.

Referring to FIG. 10, illustrates the graphical illustration of the heat retention capacity of a conventional container Vs the proposed container of the big insulated food container according to one embodiment of the present invention.

Example 2

We have tested the above mentioned products with the following criteria in our Lab.

Capacity: Convention container—1000 ml; Proposed container—1000 ml

Content used to fill the carrier: Sambar Rice (kept at 90° C.)

Quantity filled: 800 gms (Sambar Rice) (i.e., 80% of the Capacity)

Room Temperature: 28 degrees centigrade.

Note: The optimal temperature to consume the food is 55 degrees centigrade.

So the data was taken from 90 to 55 degree centigrade for both the products. Thus the comparison chart is presented. The convention product retention capacity is 4.45 Hours only whereas the proposed product retention capacity is 11 Hours.

Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

I claim:

1. A portable, insulated food container comprising:
   a vacuum insulated removable outer cover;
   a vacuum insulated base;
   a vacuum insulated base carrier;
   one or more non-insulated containers;
   one or more detachable lids;
   a supporting base;
   one or more interlocking units;
      wherein the vacuum insulated base carrier and the vacuum insulated base is a unitary system,
      wherein the vacuum insulated removable outer cover consists of one or more grips;
      wherein the interlocking unit comprises of one or more latches on the side walls of the vacuum insulated base carrier and one or more knobs on the side walls of the vacuum insulated removable outer cover,
      wherein an activated getter pill is used to maintain a high vacuum in the system, characterized in that the vacuum insulated carrier is configured to receive the outer cover which snug fits on the carrier at the insulated base, and
      wherein the snug fit of the outer cover and the vacuum insulated carrier at an outer rim of the base carrier mitigates conduction heat loss.

2. The portable, insulated food container as claimed in claim 1, wherein the one or more latches and the one or more locking pins are configured together with a twist lock mechanism for removably closing or sealing the food container.

3. The portable, insulated food container as claimed in claim 1, wherein a wall section of an inner portion of the vacuum insulated cover from the inner edge of a rim of the vacuum insulated removable outer cover to height proportionate to height from the outer rim of the vacuum insulated base carrier to an outer edge of an inner rim of the base carrier is made thinner than other portions of the wall.

4. The portable, insulated food container as claimed in claim 3, wherein the wall section of the outer wall of the vacuum insulated base carrier, from the outer edge of the inner rim of the vacuum insulated base carrier to the outer rim of the base carrier is made thinner than the other portions of the wall of the base carrier.

5. The portable, insulated food container as claimed in claim 3, wherein the vacuum insulated base carrier is stacked over by one or more detachable non-insulated containers with the one or more detachable lids adapted to form a tight seal with the inner rim of the base carrier.

6. The portable, insulated food container as claimed in claim 3, wherein the one or more detachable lids is adapted to form a tight seal with an inner rim of the vacuum insulated base carrier.

7. The portable, insulated food container as claimed in claim 1, wherein the one or more grips comprises of one or more top handles and one or more side handles affixed to the vacuum insulated top cover.

8. The insulated, portable, food container as claimed in claim 1, wherein the height of the vacuum insulated removable outer cover is greater than the height of the vacuum insulated base carrier.

9. The portable, insulated food container as claimed in claim 1, wherein the supporting base is fixed to a bottom portion of the vacuum insulated base.

10. The portable, insulated food container as claimed in claim 1, wherein the one or more detachable lids is made of at least one of BPA free plastic and stainless steel.

11. The portable, insulated food container as claimed in claim 1, wherein a rim of the vacuum insulated outer cover is configured to be received by the outer rim of the base carrier.

12. The portable, insulated food container as claimed in claim 1, wherein the vacuum insulated cover is inserted over the vacuum insulated carrier up to the outer rim of the vacuum insulated base carrier for heat insulation.

* * * * *